(12) United States Patent
Arndt et al.

(10) Patent No.: US 7,880,350 B2
(45) Date of Patent: Feb. 1, 2011

(54) MULTI PHASE GENERATOR ARRANGEMENT

(75) Inventors: Andre Arndt, Lupfig (CH); Nagib Rajput, Wettingen (CH)

(73) Assignee: Alstom Technology Ltd, Baden (CH)

( * ) Notice: Subject to any disclaimer, the term of this patent is extended or adjusted under 35 U.S.C. 154(b) by 32 days.

(21) Appl. No.: 12/481,751

(22) Filed: Jun. 10, 2009

(65) Prior Publication Data
US 2009/0309434 A1 Dec. 17, 2009

(30) Foreign Application Priority Data
Jun. 13, 2008 (EP) .................................. 08158261

(51) Int. Cl.
*H02K 5/22* (2006.01)
(52) U.S. Cl. ........................................................ 310/71
(58) Field of Classification Search .................. 310/52, 310/54–55, 71, 89
See application file for complete search history.

(56) References Cited

U.S. PATENT DOCUMENTS

| | | | | |
|---|---|---|---|---|
| 3,510,700 A | * | 5/1970 | Semenovich et al. | 310/54 |
| 4,488,072 A | | 12/1984 | Archibald et al. | |
| 4,629,917 A | * | 12/1986 | Brem | 310/59 |
| 4,866,316 A | * | 9/1989 | Humphries et al. | 310/71 |
| 5,717,267 A | * | 2/1998 | Paroz | 310/54 |
| 6,577,038 B2 | * | 6/2003 | Butman et al. | 310/201 |
| 7,088,020 B2 | * | 8/2006 | Holly et al. | 310/52 |
| 7,245,031 B2 | | 7/2007 | Drubel et al. | |
| 7,400,072 B2 | * | 7/2008 | Ward | 310/71 |

FOREIGN PATENT DOCUMENTS

| | | |
|---|---|---|
| DE | 1044247 | 11/1958 |
| DE | 1210942 | 2/1966 |
| DE | 1299074 | 7/1969 |
| DE | 102004016456 | 11/2005 |
| EP | 0707372 | 4/1996 |
| GB | 754175 | 8/1956 |

OTHER PUBLICATIONS

European Search Report for EP 08 15 82 61, dated Nov. 24, 2008.
European Search Report for EP 08 15 82 62, dated Nov. 14, 2008.

* cited by examiner

*Primary Examiner*—Tran N Nguyen
(74) *Attorney, Agent, or Firm*—Leydig, Voit & Mayer, Ltd.

(57) ABSTRACT

A hydrogen cooled generator having an axis and more than three phases, the generator comprises a main casing section enclosing a stator with windings; a casing end section; at least one end winding disposed in the casing end section; a toroidal duct formed on at least one of the casing end section and the main casing section having a bottom wall and two side walls, wherein at least one of the bottom wall and the two side walls shares a wall of the casing end section so as to form a common wall; at least one bushing penetrating the common wall and inclined towards the axis of the generator so as to form an inclination, the at least one bushing having a first end connected to the at least one winding and a second end terminating in the toroidal duct.

10 Claims, 3 Drawing Sheets

MULTI PHASE GENERATOR ARRANGEMENT

Priority is claimed to European Application No. EP 08158261.1, filed Jun. 13, 2008, the entire disclosure of which is incorporated by reference herein.

The invention relates to generators. More particularly the invention relates to hydrogen-cooled generators having more than three phases.

BACKGROUND

The stator end windings and phase rings of a typical hydrogen cooled generator are cooled by being enclosed in a casing at one end of the generator. Typically the generators cooling system comprises a fan circulating pressured hydrogen cooled by water. For efficient cooling the phase rings may be cooled in conjunction with the stator end windings but more typically, due to the cooling demand of the phase rings, they are independently cooled by means of ducting used to divert part of the cooling hydrogen inside the phase rings and return it back to the cooling medium heat exchanger. However ducting increases design complexity, due to the special requirements of hydrogen cooling and layout complexity, as a result of the number of phase rings present in multiphase generators.

Bushings are used to convey current from phase rings through the casing, while maintaining electrical insulation and ensuring the casing remains sealed, by radially extending without inclination through and outwards from the casing. The bushing ends outside of the casing are connected to insulated busbars and subsequently to a matrix converter. The radial positioning of the bushings minimises overall machine length however overall the design is not space efficient. Not only does it require significant radial space it also requires space to accommodate connecting cables. This problem is particularly acute for machines and generators with greater than three phases due to the number and complexity of the phase ring connections.

SUMMARY OF THE INVENTION

An aspect of the present invention provides a means of overcoming or at least ameliorating the space problem of multi phase hydrogen cooled generators with radially arranged bushings.

The invention is based on the general idea of orientating bushings away from the vertical towards the axis of the generator enabled by locating the phase ring ends in an external duct. In one aspect the invention provides a hydrogen-cooled generator having more than three phases. The generator comprising a casing main section enclosing a stator and a casing end section for containing the ends of the windings, is characterized by;
  a toroidal duct, formed on either the casing end section and/or casing main section, having a bottom wall and side walls wherein at least one of the walls is common with the casing end section;
  bushings, penetrating one of the common wall, inclined along the axial towards the axis of the generator and having a first end connected to the end windings and a second end terminating in the duct; and
  phase rings, located in the duct, having a first end connected to the second end of a bushing and a second end connected to a terminal board which forms an integral part of the external duct, wherein the inclination of bushings provides a compact radial design that enables the duct to enclose the phase rings outside of the casing end section. Further as the phase rings are separated from the end windings it is possible to manufacture and test the phase rings in the duct separately from the stator and winding and so providing an opportunity to reduce assembly time. Yet further the arrangement enables the space efficient location of a terminal board at one end of the duct.

In an embodiment of the invention the bushings are inclined away from the casing end section end of the generator so by further reducing the overall length generator while still maintaining a radially compact arrangement.

In a further embodiment the bottom wall of the duct is common with the casing main section providing an arrangement with longitudinal length similar to arrangements with radially aligned and outwardly extending bushings.

Another aspect of the invention provides phase rings that are air-cooled within the duct instead of the more design demanding hydrogen cooling provided if located in a hydrogen cooled casing.

Further embodiments of the invention provide various arrangements within the duct that provide space efficient designs. These include where: the bushing second ends are arranged in two or more circumferentially different rows; the phase rings are arranged in more than one layer; and/or the phase rings are arranged in one or more parallel stacks.

A further aspect of the invention is to overcome or at least ameliorate the disadvantages and shortcomings of the prior art or provide a useful alternative.

Other aspects and advantages of the present invention will become apparent from the following description, taken in connection with the accompanying drawings wherein by way of illustration and example, an embodiment of the invention is disclosed.

BRIEF DESCRIPTION OF THE DRAWINGS

By way of example, an embodiment of the invention is described more fully hereinafter with reference to the accompanying drawings, in which.

DETAILED DESCRIPTION

Figure 1:
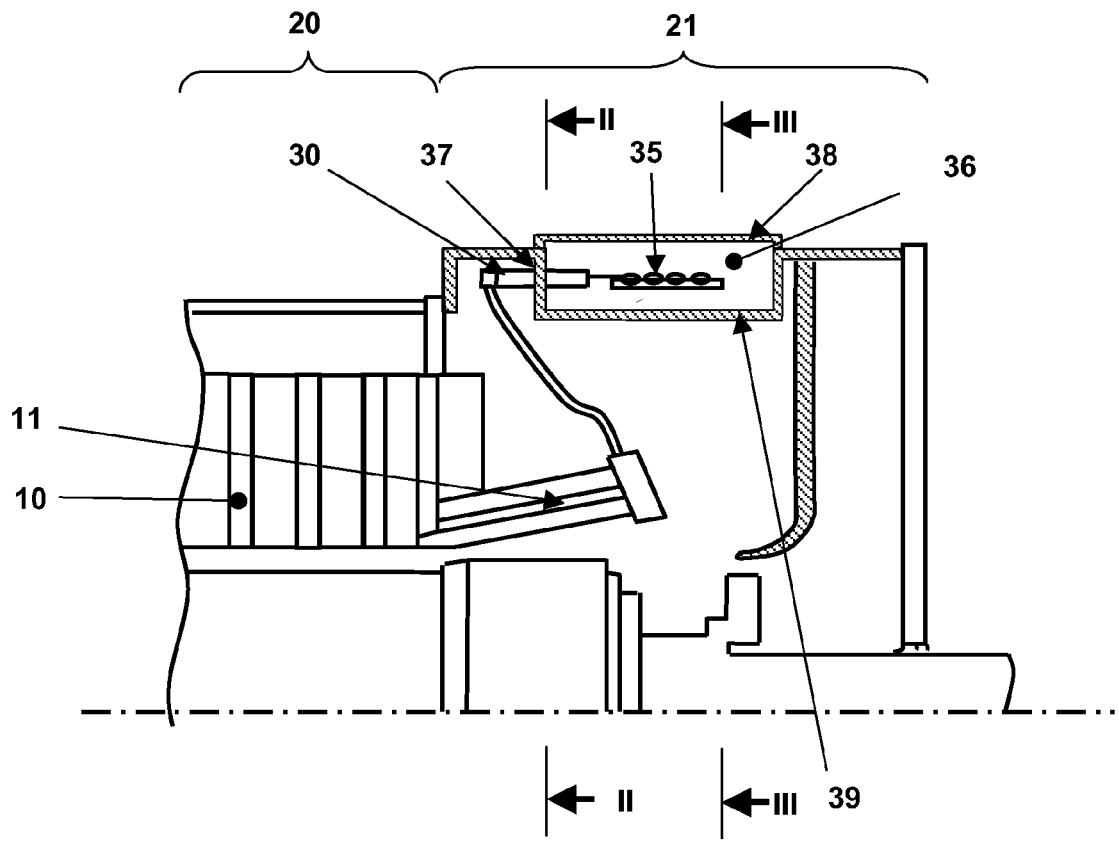
FIG. 1 is a side sectional view of an end of a hydrogen-cooled generator showing an embodiment of the invention.

Preferred embodiments of the present invention are now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details.

FIG. 1 shows a preferred embodiment of the invention applied to a hydrogen-cooled generator having winding ends 11 enclosed inside an end section 21 of a casing 20, 21. Bushings 30, penetrating the casing 20, 21, and provide the means of conduction from the winding ends through the casing 20, 21 walls. The penetration, through a wall section shared between the casing and a toroidal duct 36 formed on the casing end section 21 so as to define a common wall section, is such that the bushing ends terminate in the duct 36. This is achieved in a radially space-efficient manner by the inclination of the bushings 30 axially, towards the axis of the generator, as seen in FIG. 1. The inclination may be any significant angle off vertical, ie radial direction, preferably greater than 30° and most preferably great than 45° including 90° where the optimum angle is a balance between reducing the radial dimension while considering the longitudinal dimension of the machine.

In another embodiment the same radial space efficiency inclination is maintained while the end of the bushings instead of being inclined towards the end of the casing, as shown on FIG. 1, are inclined towards the stator core 10 corresponding to the casing main section 20.

Figure 2:
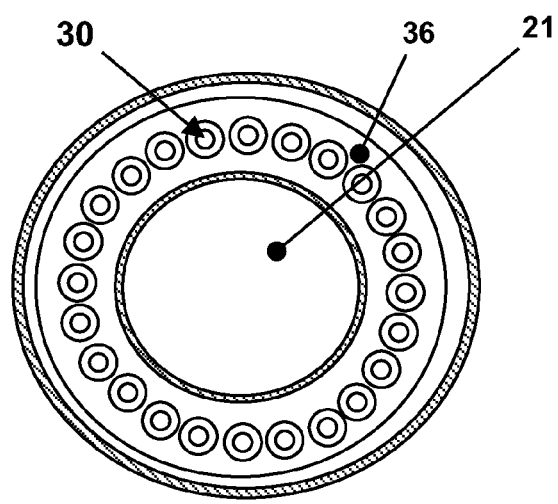
FIG. 2 is an end sectional view through section II-II of FIG. 1.

The bushings 30 penetrating the casing 21 can be arranged in various space efficient arrangements preferably in single rows, as shown in FIG. 2, or alternatively in multiple circumferential rows. Likewise the phase rings 35 are preferably arranged in single layers within the duct 36, as shown in FIG. 1 although they can be arranged in other preferred arrangements such as in vertically or horizontally stacked rows.

Figure 3:
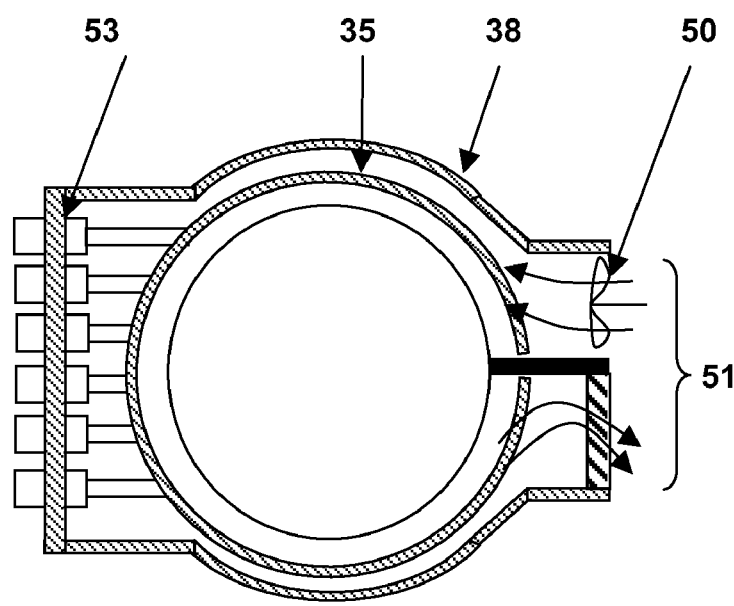
FIG. 3 is a sectional view through section III-III of FIG. 1 of the duct of FIG. 1 showing a duct air-cooling arrangement.
Figure 4:
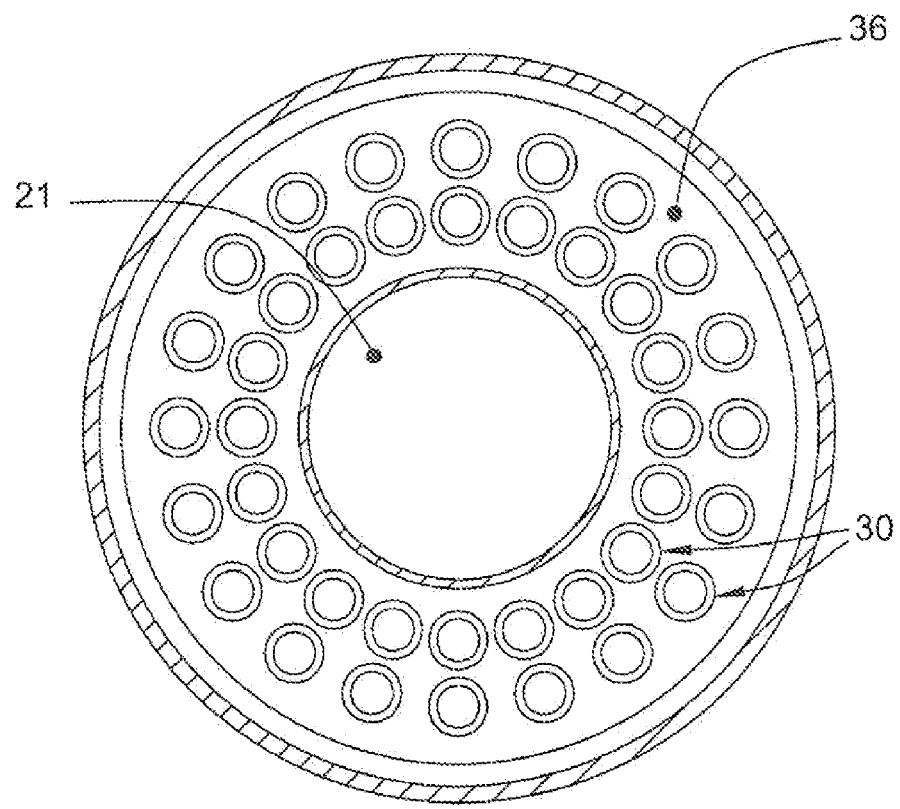
FIG. 4 is an end sectional view as in FIG. 2 showing bushings disposed in at least two circumferentially different rows.
Figure 5:
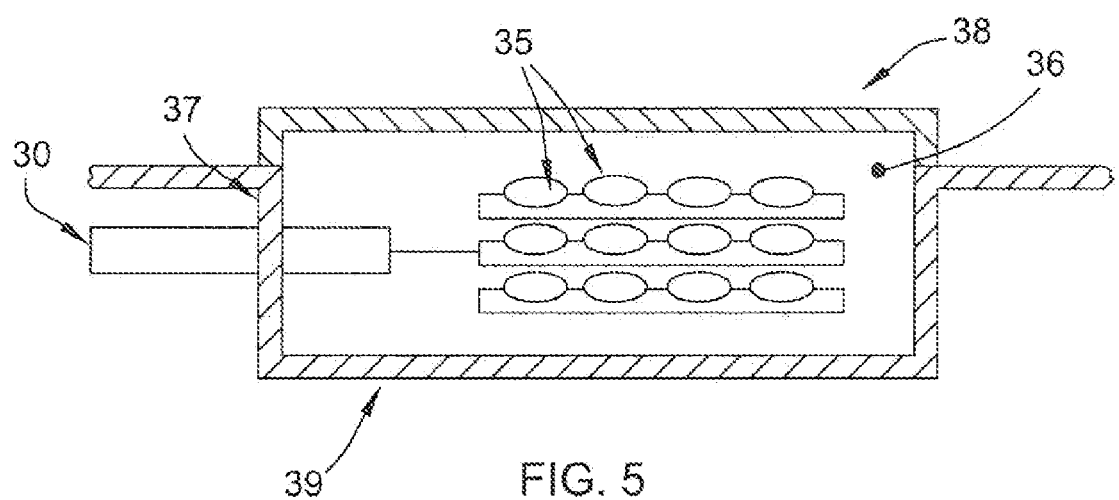
FIG. 5 is an inset of the toroidal duct of FIG. 1 showing phase rings disposed in a plurality of layers.

The toroidal duct 36, forming a part of the casing 20,21, preferably holds, protects as well as provides a means of cooling the phase rings 35. Preferably it has at least one opening 51, through a cover 38 for covering the duct 36 at which a cooling duct fan 50 is located, as shown in FIG. 3, so by providing one means of blowing cooling air through the duct. The location of the duct 36 "on" the casing 20,21 includes arrangements where the duct 36 is in a cavity formed in the casing 20, 21 as shown in FIG. 1, such that at least a bottom 39 and/or a sidewall 37 of the duct 36 and the casing is common.

In another embodiment the duct 36 is at least partially located on the casing main section 20 so as to share at least part of its bottom wall 39 with this casing section 20. Other arrangements that share at least one wall with the end casing so as to enable penetration of bushings 30 could also be conceived.

To enable the duct 36 to be more compactly designed the walls of the duct 37, 38, 39 are preferably made of non-magnetic steel and/or have an additional electrical conductive shield of aluminium or copper applied to the inside walls of the duct 36. This reduces the electric eddy-current losses in the walls 37, 38, 39.

The phase rings 35 within the duct 36 are preferably terminated at a terminal board 53 as shown in FIG. 3 forming part of the casing end section 21 of the generator. From this board 53 connections can be made as desired to for example a matrix converter.

Although the invention has been herein shown and described in what is conceived to be the most practical and preferred embodiment, it is recognized that departures can be made within the scope of the invention, which is not to be limited to details described herein but is to be accorded the full-scope of the appended claims so as to embrace any and all equivalent devices and apparatus.

REFERENCE NUMBERS

10. Stator Core
11. End windings
20. Casing main section
21. Casing end section
30. Bushing
35. Phase rings
36. Phase ring duct
37. Phase ring duct sidewall
38. Phase ring duct cover
39. Phase ring duct bottom wall
50. Duct cooling fan
51. Duct opening
53. Terminal Board

What is claimed is:

1. A hydrogen cooled generator having an axis and more than three phases, the generator comprising:
   a main casing section enclosing a stator with windings;
   a casing end section;
   at least one end winding disposed in the casing end section;
   a toroidal duct formed on at least one of the casing end section and the main casing section having a bottom wall and two side walls, wherein at least one of the bottom wall and the two side walls shares a wall of the casing end section so as to form a common wall;
   at least one bushing penetrating the common wall and inclined towards the axis of the generator so as to form an inclination relative to a radial direction of the generator, the at least one bushing having a first end connected to the at least one winding and a second end terminating in the toroidal duct; and
   a plurality of phase rings disposed in the toroidal duct, each of the plurality of phase rings having a first end connected to the second end of the at least one bushing, wherein the inclination of the at least one bushing forms a compact radial design so as to enable the toroidal duct to enclose the plurality of phase rings outside of the casing end section.

2. The generator as recited in claim 1, wherein at least a part of the bottom wall shares a wall with the main casing section.

3. The generator as recited in claim 1, wherein the at least one phase ring is air-cooled within the toroidal duct.

4. The generator as recited in claim 1, wherein the at least one bushing includes at least two bushings having second ends disposed in at least two circumferentially different rows.

5. The generator as recited in claim 1, wherein the plurality of phase rings are disposed in a plurality of layers.

6. The generator as recited in claim 1, wherein the plurality of phase rings are disposed in at least one parallel stack.

7. The generator as recited in claim 1, further comprising a cover enclosing the toroidal duct.

8. The generator as recited in claim 1, wherein the casing end section includes a terminal board, and wherein the plurality of phase rings terminates at the terminal board.

9. The generator as recited in claim 1, wherein the at least one bushing is inclined at an inclination angle of at least 30° from the radial direction of the generator.

10. The generator as recited in claim 9, wherein the inclination angle is less than or equal to 90°.

* * * * *